June 10, 1952     S. L. MAY     2,599,716
LOUPE
Filed June 29, 1950
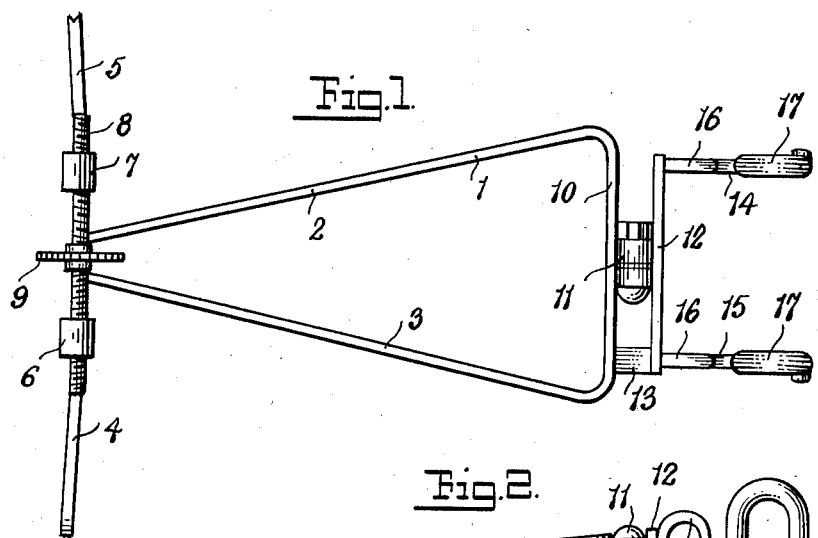
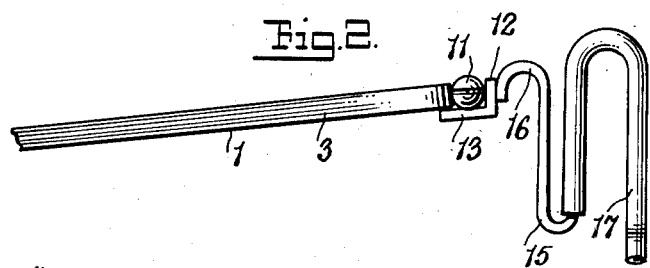
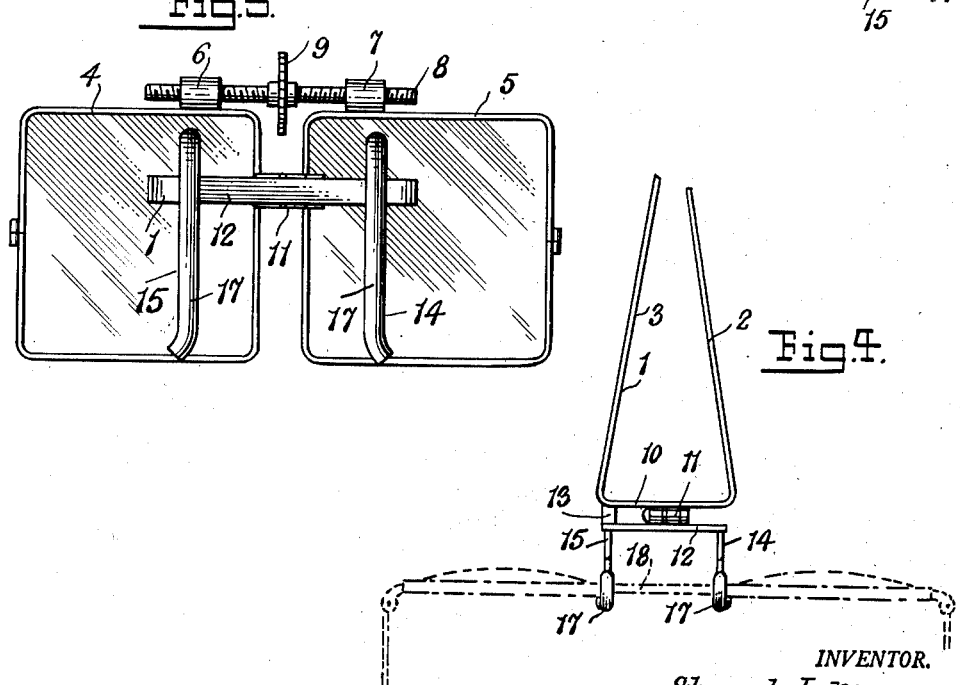
INVENTOR.
Stuart L. May
BY
Fritz Ziegler
Attorney Patented June 10, 1952

2,599,716

UNITED STATES PATENT OFFICE 2,599,716

LOUPE

Stuart L. May, Huntington, N. Y.

Application June 29, 1950, Serial No. 171,189

3 Claims. (Cl. 88—41)

This invention relates to loupes of the type generally used by watchmakers, jewelers, photographic retouchers and others performing work requiring magnification. An object of the invention is to provide an article of this character having means by which it can be securely affixed to a pair of eyeglasses without requiring any change in the structure of the normal type of eyeglasses used, or requiring the permanent attachment of a coupling means for holding the loupe connected to the eyeglasses.

Another object of the invention is to provide a loupe with means by which it may be slipped over the top of a pair of eyeglasses and will securely hold itself in place thereon, permitting upward pivotal movement of the loupe when desired to swing the same out of the wearer's line of vision.

More particularly, the invention contemplates the provision of a bar pivotally attached to a cross member on the frame of the loupe, and provided with a plurality of hook members which are readily fitted over the bridge of a pair of eyeglasses in a manner to position the loupe forwardly of the eyeglasses and in the line of the wearer's vision to enable the loupe to be used properly and easily. The arrangement as described permits the loupe to be supported by the eyeglasses yet it enables the loupe to be swung upwardly out of the line of vision when desired or quickly slipped off the eyeglasses.

With these and other objects to be hereinafter set forth in view, I have devised the particular arrangement of parts to be described and more particularly pointed out in the claims appended hereto.

In the accompanying drawing, wherein an illustrative embodiment of the invention is disclosed, Fig. 1 is a top plan view of a loupe constructed in accordance with the invention; Fig. 2 is a side elevation of the rear portion of the loupe showing the attaching means; Fig. 3 is a rear view of the loupe, and Fig. 4 is a plan view on a reduced scale, of the frame of the loupe showing how the loupe is attached to a pair of eyeglasses.

In the drawing is discolsed one type of magnifying loupe to which the invention is particularly adapted, the same in the form shown, being provided with an elongated frame 1 of flat strip metal and of triangulated form, the same having the two spring legs disclosed at 2 and 3. At one end, each of these legs carries a lens frame, that carried by the leg 2 being indicated at 5, while that carried by the leg 3 is shown at 4. The lens frames 4 and 5 are adjustable to or from one another to properly space them to center the same for the particular vision of each wearer, and this adjustment is attained by means of an adjusting disk 9 forming part of the threaded screw 8 which is oppositely threaded at its two end portions through the sleeves 6 and 7 respectively carried by the lens frames 4 and 5.

At its opposite end, the frame 1 is provided with the integral cross-piece 10 to which a bar 12 is pivotally attached by means of a hinge shown at 11. Bar 12 is provided on its lower edge with a forwardly-extending lug 13 which limits the pivotal descent of the frame 1 when the loupe is in position of use.

Attached to the face of the bar 12 is a pair of spaced-apart hook members indicated respectively at 14 and 15. These hook members are composed of spring wire having sufficient malleability to enable them to be bent slightly, if necessary, to enable them to readily fit the bridges of various types of eyeglasses or spectacles. The hook members are each provided with a forward loop portion 16 which is securely and permanently attached to the bar 12, and with a rear loop portion 17 which is preferably covered or sheathed with a protective sleeve of rubber, plastic or some other soft material to prevent possible damage to the spectacles or the lenses thereof during the placement of the loupe in position on the spectacles.

From the foregoing, the manner in which the loupe is used will be readily understood. It is fitted upon a pair of eyeglasses or spectacles by having the sheathed loop portions 17 of the hook members 14 and 15, fitted over the top of the eyeglasses at the bridge 18 thereof, as shown in Fig. 4, wherein the eyeglasses are shown in dotted lines. The hook members 14 and 15 may be readily slightly bent if necessary to enable the same to be readily fitted on the various bridges with which different types of eyeglasses are provided. When the loupe is fitted in place as above described, it will locate the magnifying lenses at the proper position for use. The pivot 11 permits the frame 1, carrying the lenses, to be swung upwardly and out of the way whenever required so that the user is not required to remove the loupe from his eyeglasses each time that he is interrupted in his work. The covering on the hooks 17 prevents damage to the eyeglasses and also serves to prevent lateral shifting of the loupe from any position in which it is fitted by the user.

While I have herein described the improved attaching means as being applied to a certain type of loupe frame, it will be apparent that such means is readily applicable to various types of loupes, such application of the novel structure being contemplated as within the scope of the claims appended hereto.

What I claim is:

1. A loupe having a frame having two spring legs each provided at one end with an integral cross-piece and at the other end with lens frames and threaded adjusting means to vary the spacing between the lenses in the frames, a bar extending substantially parallel to the cross-piece and in close relation thereto, a hinge pivotally coupling the cross-piece and the bar together, a pair of hooks attached to the bar and extending rearwardly of the same and adapted to be fitted over the bridge of a pair of eyeglasses to thereby attach the loupe to said eyeglasses.

2. A loupe having a frame having two spring legs each provided at one end with an integral cross-piece and at the other end with lens frames and threaded adjusting means to vary the spacing between the lenses in the frames, a bar pivoted to the cross-piece, a pair of sheathed hook members attached to the cross-piece for fitment over the top of the bridge of an eyeglass frame, and a lug projecting forwardly of the bar and limiting pivotal movement of the frame in one direction with relation to the bar.

3. A loupe as provided for in claim 2, wherein said lug is located at the bottom of the bar and engages against the bottom of the frame, and the hook members have double hook portions, one of which is attached to the bar and the other is free and is sheathed with a protective material.

STUART L. MAY.

REFERENCES CITED

The following references are of record in the file of this patent:

UNITED STATES PATENTS

| Number | Name | Date |
|---|---|---|
| 1,641,834 | Wrighton | Sept. 6, 1927 |
| 2,017,233 | Chester | Oct. 15, 1935 |
| 2,155,575 | Wittig | Apr. 25, 1939 |
| 2,422,661 | Ellis | June 24, 1947 |

FOREIGN PATENTS

| Number | Country | Date |
|---|---|---|
| 305,513 | Great Britain | Feb. 6, 1929 |